Aug. 21, 1956 L. D. STATHAM 2,760,038
ELECTRICAL STRAIN WIRE TRANSDUCER
Filed April 20, 1955 3 Sheets-Sheet 1
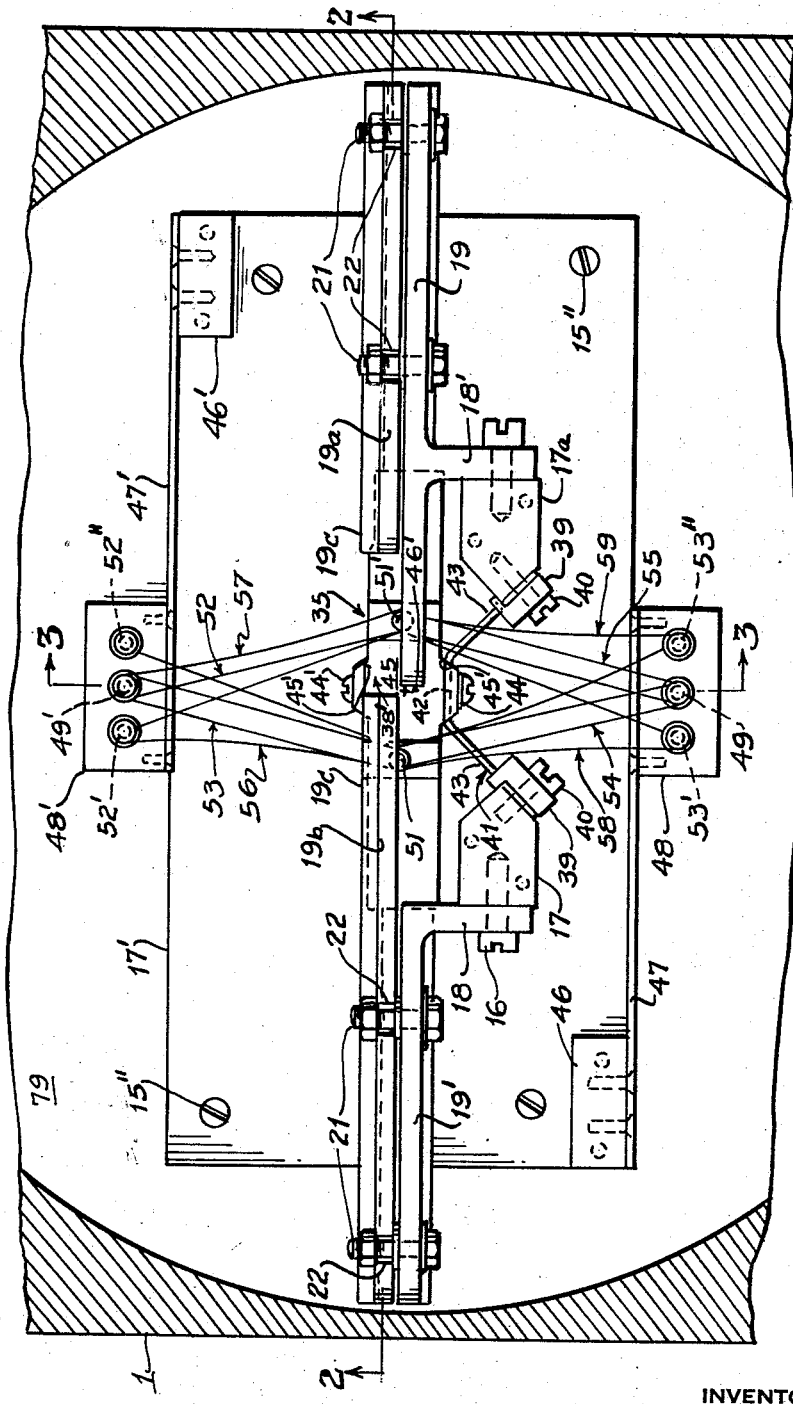
INVENTOR
LOUIS D. STATHAM
BY Philip Subrow
ATTORNEY.

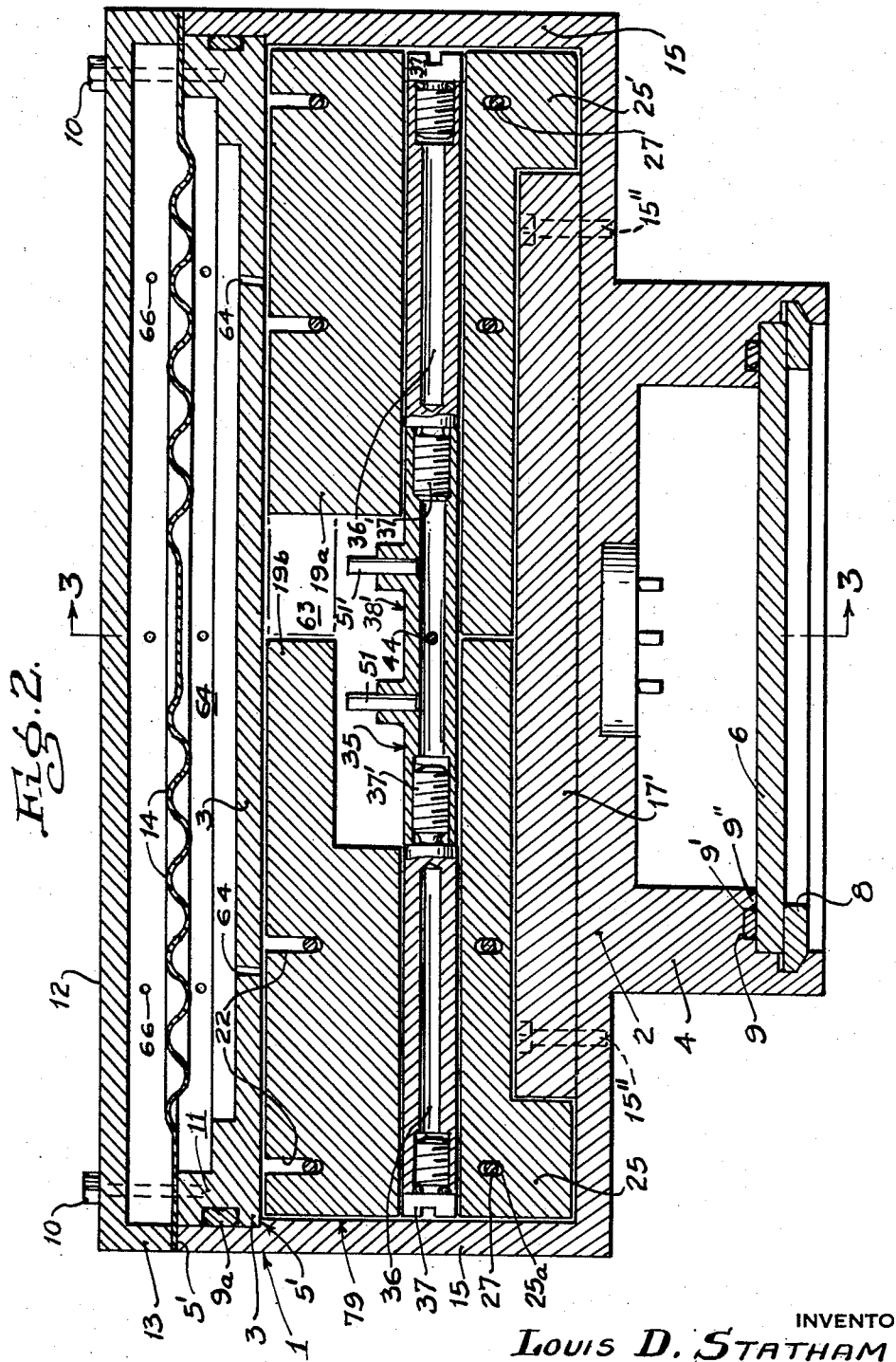

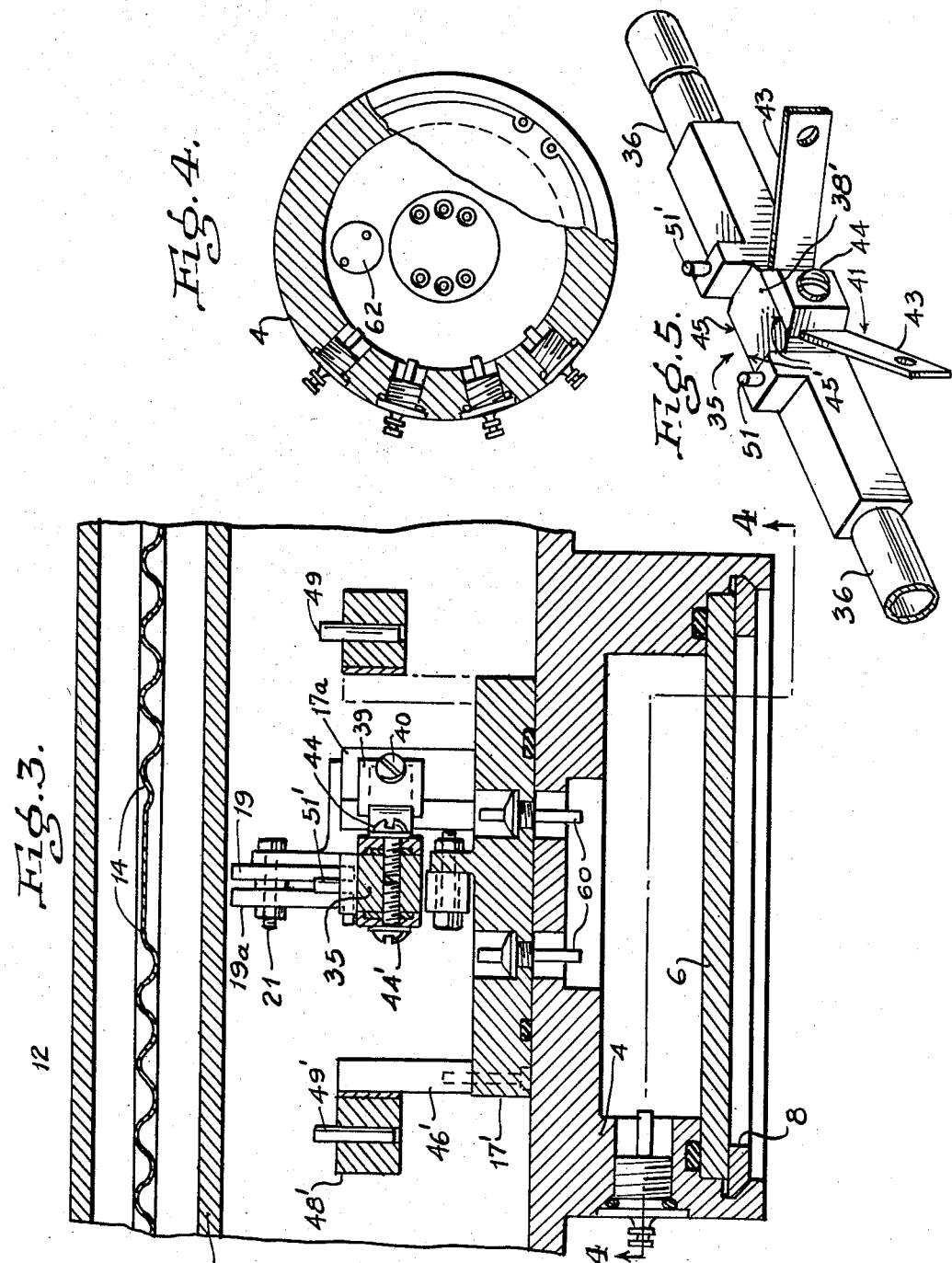

United States Patent Office 2,760,038
Patented Aug. 21, 1956

2,760,038

ELECTRICAL STRAIN WIRE TRANSDUCER

Louis D. Statham, Beverly Hills, Calif., assignor to Statham Laboratories, Inc., Los Angeles, Calif., a corporation of California Application April 20, 1955, Serial No. 502,703

20 Claims. (Cl. 201—63)

This invention relates to an electrical strain wire transducer. Transducers in which a force summing means varies the tensile stress on the wire to cause a variation in the electrical resistance of the wire which is thus a measure of the motion of or of a force imposed on a force summing means are well known. The force summing means may be a rod, diaphragm, or weight, or any other member subject to motion in space as a result of forces or motions imposed thereon. The force summing means is the medium for summing up all the forces simultaneously applied to the force summing means and transmitting the same to the wire. When the force summing means is a rod, the transducer may be a displacement measuring device; or, where the force summing means is a diaphragm, the transducer may be a pressure gauge; and, where the force summing means is a weight, it may be a velometer, accelerometer, or velocitometer, as the case may be. The foregoing is intended as illustrative and not as exhaustive of the forms of force summing means and of the applications of strain wire transducers.

Such strain wire gauges are of two general types. In one of the types, the wires are connected by one end to a fixed point, and the other end of the wire to the force summing means. In another type, wire supports are subject to motion with respect to each other, and none of the wire supports are connected to a fixed point.

In both of these forms, the nature of the winding configuration in the strain wire transducer determines whether the electrical circuit, in which the wires are connected for purpose of detecting or measuring their variation in electrical resistance, contains filaments which vary in tension all in one direction, or whether this winding includes wires whose tensions vary in opposite directions upon a displacement of the force summing means, when the electrical circuit is in the form of a bridge, as is usual. The electrical output of the bridge, i. e., the total variation in resistance and, therefore, the voltage output per unit of voltage input to this bridge is twice as great in the second instance as in the first instance. The second type of winding is preferred.

In the conventional strain wire gauge in which one end of the wire is connected to the force summing means and the other end of the wire is connected to a fixed point, it is necessary to limit the motion of the force summing means so that it does not cause a strain in the wire such that the stress exceeds the elastic limit of the wire. For wires of steel or constantan, which are most generally used in this art, such strain wire transducers are designed to limit the total strain to be produced in the wires to be not greater than 0.0015 in./in. in a zero centered instrument (i. e., with an initial strain of 0.0015 inch per inch and a total maximum strain of 0.003 inch per inch). The corresponding stress is far below the actual elastic limit of the wire, and this limit of strain is used in order to introduce a safety factor of about 1.3 to 1.5, depending on the wire employed and other practical considerations. Even when employing a permissible total strain of 0.003 in./in., it is the practice, particularly in small gauges such as the so-called subminiature gauges now commercially sold, to set stops to limit the motion of the force summing means so that the wire is stretched only eighty per cent of the permissible additional extension set by the factor of 0.0015 in./in. This factor of safety is necessary because the stops which are used cannot be set with an accuracy which will permit the strain to create a stress which would be up to, but not beyond, the elastic limit, and also because the stops cannot be considered absolutely rigidly defined surfaces.

Stops are usually set screws having a given modulus of elasticity; and the force summing means and the framework in which the transducer is mounted are also elastic members, i. e., the metal itself has elasticity. Consequently, an inaccuracy is introduced equal to the sum of the above elastic effects. The wire may thus be strained an amount greater than that which is determined by the position of theoretically rigid stops set at the limits previously referred to. For example, if steel having a modulus of elasticity of 30 million pounds per square inch (p. s. i.) were used in the frames and stops, 100 p. s. i. of force against the stops would give a deflection of 3.33 microinches/in. due to the elastic effects discussed above. If the stops and frame of the transducer were made of constantan, assuming a modulus of about 20 million p. s. i., the deflection due to elastic effects of a pressure of 100 p. s. i. would be equivalent to 5.0 microinches per inch, or considerably more than the deflection for steel.

In a transducer having strain wire with a length of one inch, set with an initial strain of 0.0015 inch per inch with stop set to permit an additional strain of .0015 inch per inch, the resulant elastic deformation at the stops could result in a strain in the wire in excess of the above figure. In order to avoid this, the stops are set so that the elastic deformation of the gauge, when added to that of the wire, does not result in a strain on the wire in excess of the safe limit described above. As a result of these considerations, the present practice is to set the stops at eighty per cent of the maximum permissible deflection, using the factor of 0.0015 in./in. of wire, so that the gauges are over-designed with a factor of safety of 1.25, which is superimposed upon the generous factor of safety implied by using 0.0015 in./in., or a total factor of safety of above 1.6 to about 2. Consequently, the wires in the present design are employed far below the capacity to produce electrical output in an optimum design for an electrical bridge circuit.

In the present wiring techniques for production of the transducers of the prior art, the strain wires are wound about their supports, usually insulating pins, under a predetermined tension, so that the wires are in equal tension. Various means have been devised for this purpose, such as placing the wire under a predetermined tension while winding. This requires either special apparatus or considerable skill. In the instrument of my invention, the instrument is self-calibrating, so that the instrument may be wound to give a predetermined tension in the strain wire.

Since, as a practical matter, the transducers are mounted in a rigid case, or other member, the variations in temperature introduce a variable in the operation in the point of the differential expansion between the wire of the transducer, the frame on which the wire is mounted, the force summing means, the case, and other elements of the construction. This results in a stressing of the wires even though no force is imposed on the force summing means. The zero point of the gauge thus shifts with changes in temperature.

In the transducers of my invention, I introduce a compensating mechanism whereby the effect of the differential expansion may be minimized and substantially suppressed.

The above and other objects of my invention are realized in an electrical strain wire gauge forming the instant invention, which is in the form of a transducer consisting of a force summing member, a strain sensitive filament composed of two filamentary elements, one of the elements being attached to the force summing member, extending therefrom to a first point of attachment, and the other of the elements extending from the first point of attachment to a second point of attachment, in such manner that the first point maintains a tension on each of the elements, and the variation in tension of the element attached to the force summing means responsive to the motion of the force summing means causes a variation in the other of said elements in an opposite direction.

The second point of attachment may be one which is not displaced in space on motion of the force summing means, as for example, it may be fixed rigidly in space by attachment to a fixed point in the case or frame of the transducer. However, it may be a movable point so that it is displaced in space relative to the motion of the point of attachment of the wire to the force summing means, so that the change in tension of the active wires connected to the aforementioned points is different. Thus, the second point of attachment referred to above may move in an opposite direction to the point of attachment of the wire to the force summing means so that the tensions in the wires caused by the motion of the force summing means change in opposite directions.

The magnitude of this change in the wires in the aforementioned forms of the transducers of my invention may be unequal or made to be substantially equal, with a resulting difference in the electrical efficiency of the transducers, as will be more fully described below.

In a preferred embodiment of my invention, the first point of attachment is subject to a constraint other than that imposed by the filaments; and it is further desirable, and to be preferred, that the ratio of the constraining force exerted on the movable point to the motion of the first point, which may, for convenience, be referred to as the spring rate of the first point, be less and preferably a small fraction of the spring rate of the wire, i. e., the ratio of the force exerted in tension on the wire to the elongation of the wire thus produced.

In the transducers of my invention, when the second point of attachment is fixed on the frame member of the transducer, when the spring rate of the first point is zero, the forces exerted on the wires are equal and opposite, or move with respect to the end of the wire attached to the force summing means in an algebraically different amount, and the change in tension in one of the elements is equal and opposite in sign to that of the first element, the force transfer from one of the elements to the other of the elements is thus 100%. However, as the spring rate of the first point increases, i. e., becomes stiffer, the force transfer falls from 100% and becomes zero when the first point may be considered to be a rigid point, and the wire extending from the first to the second point becomes entirely inoperative as an active wire of the bridge. I have discovered, however, that by employing a spring rate for the first point less than the spring rate of the wire I can obtain a substantial proportion of the theoretical electrical output of the bridge in the range of above about 75% of the theoretical output and by limiting the spring rate of the first point of attachment in the range of about 0.01 and even about .001 of the spring rate of the wire, I may increase the electrical efficiency of the bridge to more than about 99% of the theoretical efficiency of the bridge.

In the particular form of the embodiment of my invention described hereinbelow the motion of the second point is equal to and opposite to the motion of the point of attachment to the force summing means. I may obtain substantially the theoretical electrical output of the bridge irrespective of the spring constant of the first point of attachment. The force transfer from one of the wires to the other of the wires may be substantially 100%.

While the spring constant of the first point of attachment has the above effects on the electrical output of the bridge, it has a separate and important effect in permitting the avoidance of stops to limit the motion of the force summing means.

As described above, the character of the winding of the transducer of my invention, results in a variation in tension in the first wire element connected to the force summing means and to the first point of attachment which is opposite in direction to the consequent variation in tension in the second wire element connected to the first point of attachment and the second point of attachment. Thus, an increase in tension in one of the wires results in a decrease in tension in the other of the wire elements.

If the transfer of force on the wires is substantially 100%, then the wire is not increased in tension by an amount greater than that by which the other wire is relaxed in tension. By winding the wires in equal or unequal tension so that the initial tension on one of the wires when added to the tension on the other of the wire elements of the bridge, does not exceed in total sum the ultimate tensile stress imposable on any of the wires at the safe limit, or the stress at the proportionality limit of the wire, the movement of the force summing means will not stress the wires beyond the design limit thus imposed.

When the transfer is not substantially 100%, by making the spring rate of the first point sufficiently low as compared with the spring rate of the wire, the increase in tension occurring in one of the wires on continued movement of the force summing means after the complete relaxation of the second wire of the bridge, may be such as to cause but an insignificant addition to the total stress on the wires still under tension, and thus as a practical matter, giving effect to the magnitude of the movement encountered in force summing means in practical operations, thus resulting in a total stress on the wire which does not exceed, in any substantial amount, the aforesaid design limit.

The general form of the transducer of my invention comprises a pair, or a plurality of pairs, of like filaments whose electrical resistance is varied by variation in the strain imposed on each of the filaments. The filaments of each pair, wound as previously described, are electrically connected at their ends, and are joined together to a yieldable constraining means. The opposite ends of each of the wires are connected so that at least one of them is connected to a force summing means, and an end of the other of the filaments of the pair of filaments is so attached to a wire support that, upon displacement of the force summing means, the ends of each of the wires move relative to each other, so that the variation in strain imposed on one of the filaments by the force summing means is transferred to the second filament of the pair to cause a variation in strain in the opposite direction.

The tension in the wires of each pair, which change in the same direction on motion of the force summing means, may be made equal.

The differential motion may be attained by attaching one of the wires to a force summing means and the other to a point so rigidly fixed on a frame member, in comparison to the ends attached to the constraining means, as to be deemed to be a point fixed in space.

On the other hand, the second filament, instead of being attached to such a fixed point, may be attached to a means positioned with respect to the frame so that it moves in a direction opposite to the movement of the force summing means, or to give an otherwise differential motion between the force summing means and the first mentioned means.

In either case, a motion of the force summing means, which causes a variation in strain in the filament attached to the force summing means, is accompanied by a variation in strain in the other of said pair of filaments which is in the opposite direction, and also a deflection of the ends of the wires attached to the constraining means.

It is a characteristic of the transducers of my invention that the sign of the variation in strain in the filaments of each pair is opposite, to wit, the tension in one increases while it decreases in the others of the filaments of each pair. The magnitude of the variation is a function of the ratio of the spring constant of the constraining means to the spring constant of the filaments, approaching equality as the spring constant of the constraining means approaches zero.

By spring constant I mean, in the case of the constraining means, the ratio of the force exerted to the deflection of the constraining means, and, in the case of the filaments, the ratio of the stress to the strain.

The transducers of my invention will be more fully described in connection with the accompanying drawings, of which:

Fig. 1 is a horizontal section through a form of transducer of my invention;

Fig. 2 is a section taken on line 2—2 of Fig. 1;

Fig. 3 is a fragmentary detail of a section taken on line 3—3 of Fig. 1;

Fig. 4 is an irregular section, with parts in elevation, taken on line 4—4 of Fig. 3; and Fig. 5 is a perspective view of a detail of the transducer shown in Figs. 1 to 4 inclusive.

Figures 1 to 5 illustrate a variation of the strain wire transducer of my invention illustrated as applied to an accelerometer in which the inertial mass is substantially entirely a liquid mass.

Referring particularly to Figs. 1 to 3, the container 1 is shown as containing a cylindrical cavity, but may be of any shape provided that it is a closed container. The container is closed by a bottom 2 and a top 3. The bottom 2 carries a depending circular flange 4, to the lower end of which is secured a removable cover 6 held in place by snap ring 8 maintained in a suitable groove in flange 4. An O-ring 9 is positioned in a groove 9' located in a horizontal shoulder 9'' intermediate the ends of flange 4. The top 3 is held in position on the upper wall of the case 1, with the lower end portion of member 3' resting on a horizontal shoulder 5' formed by a recess in the wall. Secured to top 3 by means of bolts 10 passing into an outer upwardly extending flange 11 of the top 3 is a cover 12 having a depending flange 13. Positioned between the lower end of flange 13 and the top of flange 11 is a flexible diaphragm 14 held in place by the bolts 10. Flange 11 has an annular recess 11' therein to accommodate an O-ring 9 for sealing purposes.

As seen in Figs. 1, 2 and 3, a plate 17' is attached to the base 2 by means of screws 15'' located at the corners of member 17' (see Fig. 1). Securely mounted on the frame plate 17' is a pair of brackets 17 and 17a. Baffle plates 19 and 19' are mounted on the brackets 17 and 17a by means of lugs 18 and 18' by studs 16. The plates 19 and 19' extend from the center close to the adjacent wall of the container and upwardly to the top 3. It is notched out similarly to that described in connection with plate 19b to permit the passage of the wire supporting pins, as will be described below. Plate 19' is similar in construction to plate 19 and is similarly mounted and extends horizontally to the wall of the container, and is of a height similar to plate 19. It extends, however, to the edge of the notch in plate 19b, as will be described below.

The plates 19a and 19b are adjustably mounted on the plates 19 and 19' by means of bolts 21 passing through slots 22 in the plates 19a and 19b. Plate 19b extends longitudinally close to the edge of the container and upwardly close to the top 3. It is notched adjacent the pins 51' to accommodate the pins and the strain wire.

The plates 19a and 19b have a flange 19c which extends along the entire lower longitudinal edge of the brackets and overlaps the edge of the paddle 35. Bolts 21 pass through slots 22 in the plates 19a and 19b, the slots being provided for vertical adjustment of the baffles to vary the distance between the lower edges of the baffles and the paddle 35 described below.

A pair of lower baffles 25 and 25' are positioned directly below and in alignment with the upper baffles 19, 19', 19a and 19b (see Figs. 2 and 3). The outer edges of baffles 25 and 25' are also spaced a short distance from the adjacent container wall sections 15. The baffles 25 and 25' are secured by means of bolts 27 to a longitudinally extending bracket 29. The bolts 27 pass through slots 25a in baffles 25 and 25' for vertical adjustment of the baffles.

Positioned in the space between and parallel to the adjacent longitudinal edges of baffles 25 and 25' and the longitudinal edges of plates 19, 19', 19a and 19b is a buoyant paddle 35 of low mass, the paddle extending diametrically of the cylindrical container. The paddle is generally in the form of an elongated hollow member with the ends sealed. The paddle of the instant embodiment is shown as being formed of two aligned hollow cylinders 36 with their outer ends sealed by threaded caps 37. The inner adjacent ends of reduced diameter of cylinders 36 are each threaded as at 37' into opposite ends of a central hollow oblong paddle mount 38'. However, a paddle of any structural shape or configuration may be employed according to the invention, so long as the mass of the paddle in the liquid is maintained small according to the invention. Theoretically, it is not necessary for the paddle to have any apparent mass when submerged in the liquid; i. e., it may be completely buoyant; all that is required is that it be structurally rigid. The paddle may be constructed of any material conferring the foregoing mass characteristics on the paddle, such as magnesium, aluminum, plastic and the like. The reason for this is that the liquid inertial mass, as will be more clearly seen hereinafter, serves as the rotor.

The outer edges of the paddle 35 may touch the adjacent wall sections 15 so long as the paddle is free to rotate over the wall. However, this will reduce the resolution of the instrument, and it will not respond to as low values of acceleration change as when such end gaps are provided.

The paddle 35 is mounted on a leaf spring type Cardan suspension so as to pivot on the central axis of the container 1 and of the paddle mount. The pivot mounting shown in Figs. 2 and 3 consists of angularly faced brackets 17 and 17a. Secured to the angular faces of the brackets by means of clamps 39 (see Fig. 1) and by bolts 40 passing through them is a V-shaped spring 41 (see Fig. 5) having a planar base 42, the angles formed by the legs 41 of the V and the base being equal. The base of the spring is connected by a screw 44 to the central hub 45 of the paddle mount 38' so as to put the axis of the paddle on a line passing through the diameter of the cylindrical container. The paddle 35 can thus pivot about the central axis of the container and paddle mount on the spring 41.

The hub 45 of the paddle has a symmetrical boss 45' on opposite sides of the hub, and a screw 44' of the same weight and contour as screw 44 is fastened to the opposite side of the hub. This hub structure makes the paddle completely symmetrical, that is, the paddle is completely balanced in weight and is symmetrical in form about a longitudinal axis through the central axis of the cylindrical paddle and also about an axis perpendicular thereto and passing through the paddle pivot point 46′, which is substantially at the intersection of the legs 43 of spring 41.

Connected to opposite corners of the plate 17′ are two brackets 46 and 46′. Mounted on each of the brackets 46 and 46′ are leaf springs 47 and 47′ which extend parallel to each other and to the axis of the paddle 35. Each of the springs carries a block 48 and 48′ mounted on the end of the springs 47 and 47′. Each of the blocks 48 and 48′ carries an electrically insulated pin 49 and 49′, whose centers are aligned on a central axis passing through the pivot axis 46′. Mounted on the hub 45 and spaced equally on both sides of the axis 46′ are two insulated pins 51 and 51′. Insulated terminal pins 52′, 52″, 53′ and 53″ are mounted in blocks 48 and 48′. Each of the insulated pins are capped with a metallic cap, to which the wires may be soldered.

A strain sensitive wire 52 is wound in tension between pins 49′ and 51′ in a loop, the ends of the loop terminating at and soldered to the cap on pin 49′. A strain wire 53 is also wound in tension between pins 51 and 49′ in a loop, both ends of the loop terminating at and soldered to the cap on pin 49′. In the same manner a strain wire 54 is wound in tension in a loop between pins 51 and 49 and terminates at the cap of pin 49. A strain wire 55 is wound in tension in a loop between pins 51 and 49, the ends of the wire terminating at the cap of pin 49. All the pins are electrically insulated and the wires are out of contact with the frame and with each other. The ends of each of the four wires 52, 53, 54 and 55 are respectively connected by slack conductors, such as 56, 57, 58 and 59, terminals 53″ and 53′ and 52′ and 52″ insulated from block 48′ and from block 48, and these terminals in turn are connected by conductors (not shown) to terminals 60 (see Fig. 3) extending through bottom 2 of the device. The latter terminals are connected in a conventional Wheatstone bridge arrangement to the four outer terminals 61 located on the periphery of flange 4. The original tension in each of the wire loops 52, 53, 54, and 55 may be made equal, not more, and for safety is made less, than one-half the design limit of stress, i. e., the ultimate stress, yield point, or proportionality limit chosen. The paddle is maintained in its central position when the case is at rest or in uniform translation or rotation, i. e., when not accelerated.

The case or container 79 may be completely filled with liquid through a fill hole stoppered by a screw 62 (see Fig. 4) and the fluid enters and fills the chamber 63 between the bottom and top members 2 and 3 of the device, and passes into and fills the chamber 64 underneath the diaphragm 14 through ports 63. Suitable air breather holes 66 are provided in the flange 13.

The details and properties of the accelerometer described in connection with the above Figs. 1 to 5 are the subject matter of co-pending applications Serial No. 431,764, filed May 24, 1954, and Serial No. 328,416, filed December 29, 1952, of which this application is a continuation in part.

The transducer of my invention may be used to determine the relative angular displacement of the paddle 35 resulting from the relative motion of the liquid and the case in angular acceleration of the case and illustrates one application of the transducer of my invention forming the subject matter of this application.

An acceleration of the case in a clockwise direction will cause the paddle to rotate counterclockwise about its axis 46′ due to the intertia of the liquid which fills the container. Owing to the fact that the wires 54 and 55 are wound with equal tension and make equal angles with the line through pins 49 and 49′, as do also wires 52 and 53, pins 51 and 51′ being equally spaced from this line, the angular displacement of the pins 51 and 51′ result in changes in the strain in wires 52 and 53, which are equal in magnitude but opposite in direction. Thus, the tension in wire 53 is increased by an amount substantially equal to the relaxation in tension occuring in wire 52. The same situation occurs in the wires 54 and 55 which are wound similarly to wires 53 and 52 and with like geometry. The wires 53 and 54 relax in tension in an amount equal to the increase in tension in wires 52 and 55.

It will also be observed that with the strain transference described above, no deflection of the springs 47 and 47′ from their original position with the case at rest occurs, since there is no change in force on the springs 47 and 47′, on the deflection of the paddle. This condition will occur irrespective of the spring constant of the springs 47 and 47′, and in such case, the pins 49 and 49′ may be considered as functionally rigidly fixed in the case. This follows from the fact that the forces exerted on the springs 47 and 47′ are in each case the sum of the pull resulting from the tension of the wires attached to the spring. If one relaxes in tension by an amount by which the other increases in tension, then the spring will feel no difference on the total pull on the spring. Any inequality in the variation of tension, however, will result in a change in force on the spring in an amount equal to the inequality.

This condition will thus continue until the deflection relaxes the wires 53 and 54 completely. When this condition obtains the springs act only and the wires 55 and 52 increase in tension on further deflection of the paddle. However, by limiting the spring constant of the springs 47 and 47′ to a low value the increase in tension on the wires resulting from any given degree of angular displacement of the paddle 35, beyond the point where the wires 53 and 54 go slack, will be small and proportional to the spring constant of the spring.

Since the spring constant of the spring is made to be a fraction of the spring constant of the wire, it will take an extremely large deflection of the paddle to cause a dangerous increase in strain in the wire beyond the point where one of the wires goes slack. Thus, reverting to our example, if the spring constant of the springs is 0.01 of the spring constant of the wire, which is the same for all the wires, and assuming that it is desired to limit the strain in the wires not to exceed 0.003000 inch/inch, and that the original strain in the wires is set at 0.001485 inch/in., the deflection of the paddle which results in a reduction in the strain in one of the wires in an amount equal to 0.001485 inch/in., will not strain the other wire beyond 0.003000 inch per inch. Likewise, when the paddle moves to increase the strain in one of the wires, and to increase this strain in the wire an amount equal to .00001 inch/inch, will require a deflection of the spring of substantially 0.001 inch per inch and a deflection of the paddle equal to substantially 0.001 inch. If the above design factors are used, the permissible maximum strain may be 0.0003 inch, and thus the permissible paddle deflection beyond the point where one wire goes slack would be 0.0015 inch. This deflection is in the usual case beyond that to be expected in such instruments.

As will be seen from what has been said previously, the output of the transducer illustrated in Figs. 1 to 5 is substantially 100% efficient, employing the definition of efficiency described above.

The application of this type of transducer makes possible the variation of the sensitivity of the instrument, defined as the change in strain in the wires per degree of deflection of the force summing means, i. e., the paddle. Thus, by increasing the included angle between the wire loops 52 and 53, and also between loops 54 and 55, we will decrease the change in strain in the wires per degree of deflection of the paddle. This can be done either by separating the pins 51 and 51′ or decreasing the separation between pins 51 and 51′ and the axis of rotation of the paddle 35, or by both means. In like manner the included angle may be made smaller so as to cause the wire loops to approach parallelism by either separating the pins 49 and 49′ from the axis of rotation 46′ or by bringing the pins 51 and 51′ closer together, or by both means. Where the restoring force on the paddle is in large part the change in tension of the wires, the spring rate of the Cardan suspension being made but a small fraction of the spring rate of the wires, this control of the included angle between the wires provides a means for adjusting the range and also the natural frequency of the accelerometer.

I may employ only two active strain wires by omitting the wire loops 52 and 53 and the spring 47 and block 46. I may in place of wires 53 and 52 employ fixed resistances to complete the Wheatstone bridge. As in the case of all such transducers, by employing only two active arms, the voltage output of the bridge per volt input per unit deflection of the force summing means is half of that to be expected where all four arms of the Wheatstone bridge are active strain wires whose tension varies on deflection of the force summing means.

While I have described a particular embodiment of my invention for the purpose of illustration, it should be understood that various modifications and adaptations thereof may be made within the spirit of the invention as set forth in the appended claims.

I claim:

1. A strain wire transducer, comprising: a frame, a lever pivotally mounted on said frame for rotation about an axis of rotation, a movable force summing means, a motion transmitting connection to said lever, whereby said lever pivots on said axis on motion of said force summing means, a first wire support mounted on said lever and positioned on one side of said axis, a second wire support mounted on said lever on the other side of said axis, said wire supports being equally spaced from said axis, a third wire support, a yieldable constraining means mechanically connected to said third wire support, a pair of electrical resistance strain wires, one of the wires of said pair connected to and extending in tension between the first and third wire supports and the second strain wire of said pair connected to and extending in tension between the second and third support, whereby one of said wires increases in tension while the other of said wires decreases in tension on displacement of said force summing means.

2. A transducer according to claim 1, wherein the spring constant of said constraining means is less than the spring constant of said wires.

3. A transducer according to claim 1, wherein the spring constant of said constraining means is from about .01 times to zero times the spring rate of the wires.

4. A transducer according to claim 1, wherein the spring rate of the constraining means is from 0.001 to 0.01 times the spring rate of the wires.

5. A strain wire transducer, comprising: a frame, a lever pivotally mounted on said frame for rotation about an axis of rotation, a movable force summing means, a motion transmitting connection to said lever, whereby said lever pivots on said axis on motion of said force summing means, a first wire support mounted on said lever and positioned on one side of said axis, a second wire support mounted on said lever on the other side of said axis, said wire supports being equally spaced from said axis, a third wire support, a yieldable constraining means mechanically connected to said third wire support, a pair of electrical resistance strain wires, one of the wires of said pair connected to and extending in tension between the first and third wire supports and the second strain wire of said pair connected to and extending in tension between the second and third support, said wires of said pairs being equally tensioned at less than one-half of the ultimate tensile stress of the wires, whereby one of said wires increases in tension while the other of said wires decreases in tension on diplacement of said force summing means.

6. A transducer according to claim 5, wherein the spring constant of said constraining means is less than the spring constant of said wires.

7. A transducer according to claim 5, wherein the spring constant of said constraining means is from about 0.01 times to zero times the spring rate of the wires.

8. A transducer according to claim 5, wherein the spring rate of the constraining means is from 0.001 to 0.01 times the spring rate of the wires.

9. A strain wire transducer, comprising: a frame, a lever pivotally mounted on said frame for rotation about an axis of rotation, a movable force summing means, a motion transmitting connection to said lever, whereby said lever pivots on said axis on motion on said force summing means, a first wire support mounted on said lever and positioned on one side of said axis, a second wire support mounted on said lever on the other side of said axis, said wire supports being equally spaced from said axis, a third wire support, a yieldable constraining means mechanically connected to said third wire support, a pair of electrical resistance strain wires, one of the wires of said pair connected to and extending in tension between the first and third wire supports and the second strain wire of said pair connected to and extending in tension between the second and third support, said wires being unequally tensioned and the sum of the tensions of said wires being less than the ultimate tensile stress of the wires, whereby one of said wires increases in tension while the other of said wires decreases in tension on displacement of said force summing means.

10. A transducer according to claim 9, wherein the spring constant of said constraining means is less than the spring constant of said wires.

11. A transducer according to claim 9, wherein the spring constant of said constraining means is from about .01 times to zero times the spring rate of the wires.

12. A transducer according to claim 9, wherein the spring rate of the constraining means is from 0.001 to 0.01 times the spring rate of the wires.

13. A strain wire transducer, comprising: a frame, a lever pivotally mounted on said frame for rotation about an axis of rotation, a movable force summing means, a motion transmitting connection between said lever and said force summing means, a first wire support mounted on said lever on one side of said axis, a second wire support mounted on and spaced from said axis, a third wire support, a first spring mechanically connected to said frame and to said third wire support, a fourth wire support, a second spring mechanically connected to said frame and said fourth wire support, a first electrical resistance strain wire connected to and extending in tension between the first support and said third support, a second electrical resistance strain wire connected to and extending in tension between said second support and said third support, a third electrical resistance strain wire connected to and extending in tension between the first support and said fourth support, a fourth electrical resistance strain wire connected to and extending in tension between the second support and said fourth support, and means to connect said wires to a Wheatstone bridge arrangement.

14. A transducer according to claim 13, wherein the spring constant of said springs is less than the spring constant of said wires.

15. A transducer according to claim 13, wherein the spring constant of said spring is from about 0.01 times to zero times the spring rate of the wires.

16. A transducer according to claim 13, wherein the spring rate of the springs is from 0.001 to 0.01 times the spring rate of the wires.

17. A strain wire transducer, comprising: a frame, a lever pivotally mounted on said frame for rotation about an axis of rotation, a movable force summing means, a motion transmitting connection between said lever and said force summing means, a first wire support mounted on said lever on one side of said axis, a second wire support mounted on and equally spaced from said axis, a third wire support, a first spring mechanically connected to said frame and to said third wire support, a fourth wire support, a second spring mechanically connected to said frame and said fourth wire support, a first electrical resistance strain wire connected to and extending in tension between the first support and said third support, a second electrical resistance strain wire connected to and extending in tension between said second support and said third support, a third electrical resistance strain wire connected to and extending in tension between the first support and said fourth support, a fourth electrical resistance strain wire connected to and extending in tension between the second support and said fourth support, the tensions in said wires being equal, and means to connect said wires to a Wheatstone bridge arrangement.

18. A transducer according to claim 17, wherein the spring constant of said springs is less than the spring constant of said wires.

19. A transducer according to claim 17, wherein the spring constant of said springs is from about 0.01 times to zero times the spring rate of the wires.

20. A transducer according to claim 17, wherein the spring rate of the springs is from 0.001 to 0.01 times the spring rate of the wires.

No references cited.